H. C. HUNT.
Wheel-Cultivator.

No. 59,720.  Patented Nov. 13, 1866.

UNITED STATES PATENT OFFICE.

H. C. HUNT, OF AMBOY, ILLINOIS, ASSIGNOR TO HIMSELF AND C. D. VAUGHAN, OF SAME PLACE.

IMPROVEMENT IN CULTIVATORS.

Specification forming part of Letters Patent No. 59,720, dated November 13, 1866.

*To all whom it may concern:*

Be it known that I, HENRY C. HUNT, of Amboy, in the county of Lee and State of Illinois, have invented a new and useful Improvement in Cultivators; and I do hereby declare that the following is a full, clear, and exact description of the same, reference being had to the accompanying drawings, and the letters and figures marked thereon, which form part of this specification.

The nature of my said invention consists in a novel arrangement of the wheels with the frame of the cultivator, whereby the machine may be turned at will from side to side, thus adapting it to any curves or irregularities in the rows without any independent lateral motion of the plows.

My invention further consists in a novel arrangement for raising the plows from the ground, and for pressing the same down when desired, so as to keep them in the ground.

My invention further consists in the employment of a main circular frame with an interior secondary frame supporting the main frame, whereby great strength is secured in the construction of the machine.

My invention further consists in the arrangement of a U-beam within the aforesaid interior frame, whereby an unobstructed view is had by the operator of the row of corn and the operation of the shovels or plows.

My invention further consists in a novel mode of attaching the shovels or plows to the shanks or standards; and also in a novel arrangement or mode of securing the movable seat to the said secondary frame, all as hereinafter more fully set forth and described.

To enable those skilled in the art to understand how to construct and use my invention, I will proceed to describe the same with particularity, making reference in so doing to the aforesaid drawings, in which—

Figure 1:
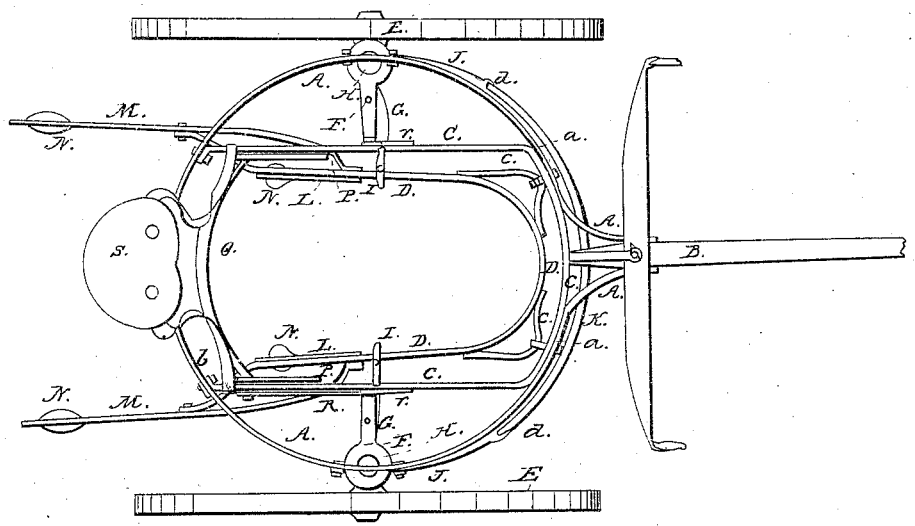
Figure 2:
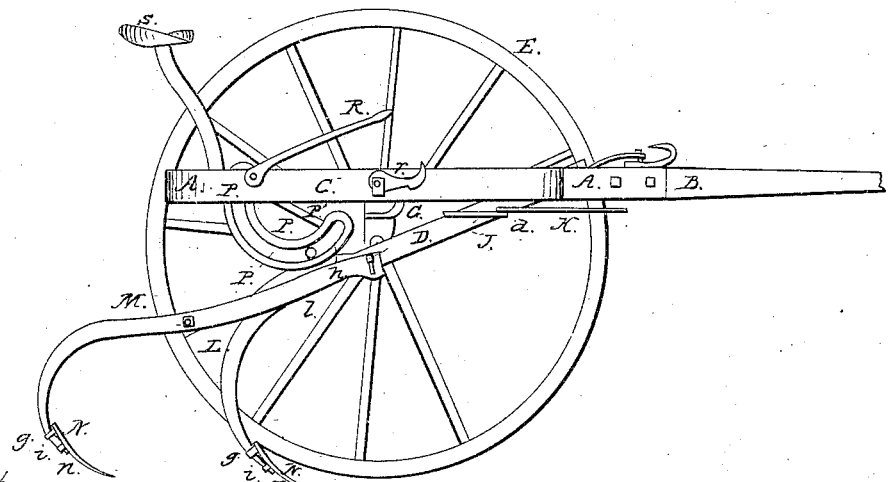

Figure 1 represents a plan or top view of my invention; and Fig. 2, a side elevation of the same, the frame being broken away, as shown at *x* in Fig. 1.

A represents a single bar of wrought-iron of suitable size and strength, bent in the form of a circle, the two ends being brought around in front, and secured to the draft-pole B by bolts passing through the same, as shown. Within said circular frame there is arranged a secondary frame, (marked C,) also constructed of a single bar of wrought-iron, bent in a rectangular form, being firmly secured to the said exterior circular frame at each corner by the bolts *a* and *b*, as shown.

D represents a curved or U-shaped bar of wrought-iron, arranged as shown, forming the beams to which the plows are attached, as hereinafter described.

To the front part of the U-beam are attached the draw-loops *c c*, whereby the beam is secured to both the main and secondary frames at *a* by the same bolts which secure said frames together.

The wheels E are supported upon suitable spindles, which have a vertical bar attached to their inner ends, extending up above the hub of the wheels, to the top of which is attached a circular plate or transom, provided with a king-bolt, H, passing up through the plate F, which is secured firmly to the outer and inner frames, A C, as shown. The aforesaid transom-plate projects out over the hub of the wheel, so as to form a housing for the same.

G represents an arm or lever attached to the transom-plate upon the spindles, which extends inward beneath the frame, as shown, turning up at its end, and provided with a stirrup or foot-rest, (marked I,) so that the driver upon the seat, by pressing his foot upon the same, may cramp the wheels upon the frame, as desired.

*r* represents a hook or catch, which may be clasped down over the arms G, if desired, and thus the wheels and frame be rigidly connected, when desired.

J represents two arms extending forward, as shown, and connected by joints at *d* to the bar K, so that the cramping of either wheel by the driver also cramps at the same time, and to the same extent in the same direction, the other wheel.

To the inner side of the beams D, the shanks or standards M are attached by a bolt passing through both beam and shank at *l*, and by a similar bolt passing through the beam and a vertical slot in the end of the shank, whereby the position of the plows may be changed or adjusted, as required. The outer shanks, M, are attached in a similar manner to the beam, the shank being curved outward, as shown, so as to give its plows the proper position, the rear end of the beams curving outward, so as to attach to the shank, and also curving upward slightly to conform to the upward sweep of that part of the shank M.

From the relative position of the plows, the fulcrum-pivot $l$, and the end of the shank L, it will be observed that a downward movement of the end of the shank will throw the plow downward and backward, and an upward movement will throw the plow upward and forward, while in the case of the shanks M corresponding movements give opposite results.

Through the rear ends of the inner frame, C, passes the crank-shaft Q, having bearings in each side of the frame, and being provided at one end with the lever R, so that said shaft may be operated, as hereinafter described, by the hand or feet of the driver. Upon each end of the said shaft Q there is rigidly attached, just over each beam D, the slotted cam-levers, (marked P,) said levers being braced and strengthened, as shown, by the arm P'.

Upon the beams D are attached in any suitable manner spindles to support the pulleys or grooved rollers, (marked $h\ h$,) which, being arranged in the slots $p$ in said cams P, fit closely therein, being retained by the edges of the slots entering the grooves in the rollers. At $p'$ there is an enlargement in said slots, whereby the said rollers are introduced into the said slots and withdrawn therefrom when desired. Through this arrangement, by turning the shaft Q backward the beams D are gradually raised up until they come nearly in contact with the frame C, while by a reverse motion of said shaft the plows are not only lowered, but are forcibly held down in any required position by the action of said cams.

When the plows are raised up and the lever R thrown back they may be secured in such position by clasping a hook over the lever, or in any other suitable manner.

By having the shaft Q curved backward the driver can make use of his own weight in raising the plows; and it also leaves the center of the machine open, so as to afford an unobstructed view of the operation of the plows.

The shovels N are provided with two loops or eyes, firmly riveted thereto, a larger one, $g$, sliding upon the shank, and a smaller one, $i$, resting against a shoulder upon said shank, as shown, (marked $m$,) so that by means of the nut $n$ the shovels are rigidly and securely attached to the shank, while by simply loosening the said nut the shovels may be adjusted so as to throw the furrow either from or toward the row, as desired, while by making the shovels with the eyes irremovably attached the scouring of the same is much more perfect than where the shovels are attached by removable bolts.

The seat S is attached to a steel spring, curved in such a manner as to afford a proper elasticity, and also bent in such a manner, substantially as shown, at the lower ends as to form a self-lock upon the sides of the interior frame to hold it securely in place by the weight of the seat and driver, and without the use of bolts or other similar devices, while at the same time it may readily and easily be adjusted upon the frame C in any desired position.

By loosening the nuts upon the bolts $a$ and withdrawing the rollers $h\ h$ from the cams P at $p'$, the entire appliances for cultivating may be removed, and the machine be used for the same purposes as any light carriage or gig, care being taken to properly adjust the hooks $r$ upon the arms G, as aforesaid.

Having described the construction and operation of my invention, I will now specify what I claim and desire to secure by Letters Patent—

1. The combination of the circular frame A and rectangular frame C, when constructed and arranged substantially as and for the purposes specified.

2. Constructing the two beams of a single piece of wrought-iron or wood, bent in the form of the letter U, or any equivalent form, provided with the draw-loops, as and for the purposes shown.

3. The employment of the cams P, arranged with respect to the plow-beams and frame of a cultivator, substantially as and for the purposes specified.

4. The employment of the rollers $h\ h$, when arranged with the cams P and beams D, and operating as and for the purposes described.

5. The crank-shaft Q, arranged and operating with the cams D, substantially as specified and shown.

6. The employment of a transomed spindle, constructed and operating as herein shown and set forth.

7. In combination with said transomed spindles, the arrangement of the arms J, extending parallel with each other forward, so that the connecting-bar K will not obstruct the view of the operator, as and for the purposes described.

8. The employment of the hooks $r$, or their equivalent, for the purposes specified, in the manner described.

H. C. HUNT.

Witnesses:
W. E. MANS,
J. A. C. THOMPSON.